United States Patent Office.

FERDINAND DICKENSON, JR., OF HARTFORD, CONNECTICUT, ASSIGNOR TO HIMSELF AND JAMES E. COLEMAN, OF SAME PLACE.

Letters Patent No. 91,216, dated June 15, 1869; antedated June 4, 1869.

IMPROVED COMPOSITION TO BE USED IN THE MANUFACTURE OF PAINTS, CEMENTS, HARD AND SOFT RUBBER, AND THE LIKE.

The Schedule referred to in these Letters Patent and making part of the same.

*To all whom it may concern:*

Be it known that I, FERDINAND DICKENSON, Jr., of the city and county of Hartford, and State of Connecticut, have invented or discovered a new and useful composition or compound, adapted for various purposes, as paint, putty, rubber goods, and various other purposes to which it may be adapted; and to enable others skilled in the art to use the same, I will proceed to describe its characteristic property.

It consists, principally, of a mineral found under the earth's surface, which, when analyzed, is found to be composed of silica, alumina, oxide of iron, and magnesia, in somewhat varying proportion, mixed with oil or other suitable material, to render it plastic, and with gum-caoutchouc, for filling and vulcanizing for goods.

In preparing this material or composition for use, I first grind or pulverize the substance to a powder; then it is mixed with caoutchouc or other gums, for filling, much in the common way of preparing the gums for rubber goods, or with oil or oily material for paint, putty, &c.

I believe I have thus shown the nature of this compound, and the advantage to be derived therefrom as a component of rubber goods, paint, and putty, so that others skilled in the art can compound the same.

What I claim, therefore, and desire to secure by Letters Patent, is—

A mineral substance, substantially as described, with oil or oily material, or with gum-caoutchouc, or other gums, as a new compound for rubber goods, paint, putty, and other articles to which it may be applicable.

FERDINAND DICKENSON, JR. [L. S.]

Witnesses:
 E. W. BLISS,
 JEREMY W. BLISS.